United States Patent
Larsson et al.

(10) Patent No.: US 8,385,820 B2
(45) Date of Patent: Feb. 26, 2013

(54) SYSTEMS AND METHOD FOR CANCELING FEEDBACK INTERFERENCE

(75) Inventors: Peter Larsson, Solna (SE); Jiansong Gan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 13/144,049

(22) PCT Filed: Jan. 12, 2009

(86) PCT No.: PCT/SE2009/050013
§ 371 (c)(1),
(2), (4) Date: Jul. 11, 2011

(87) PCT Pub. No.: WO2010/080055
PCT Pub. Date: Jul. 15, 2010

(65) Prior Publication Data
US 2011/0269395 A1 Nov. 3, 2011

(51) Int. Cl.
*H04B 7/14* (2006.01)
(52) U.S. Cl. ......... 455/24; 455/7; 455/8; 455/9; 455/10; 455/11.1; 455/63.1; 455/68; 455/69; 455/114.2; 455/296; 375/211; 375/213; 375/220; 375/221
(58) Field of Classification Search ............... 455/7–10, 455/11.1, 24, 63.1, 68–70, 114.2, 296; 375/211, 375/213, 215, 219, 220, 221
See application file for complete search history.

(56) References Cited

U.S. PATENT DOCUMENTS

| | | | |
|---|---|---|---|
| 7,627,287 B2 * | 12/2009 | Moss | 455/16 |
| 7,831,203 B2 * | 11/2010 | Lee et al. | 455/22 |
| 7,873,315 B2 * | 1/2011 | Ma et al. | 455/11.1 |
| 8,068,783 B2 * | 11/2011 | Braithwaite et al. | 455/24 |
| 8,073,385 B2 * | 12/2011 | Braithwaite et al. | 455/9 |
| 8,150,309 B2 * | 4/2012 | Braithwaite | 455/7 |
| 8,155,303 B2 * | 4/2012 | Kim et al. | 379/406.08 |
| 2008/0113617 A1 | 5/2008 | Braithwaite | |
| 2009/0197541 A1 * | 8/2009 | Crilly et al. | 455/69 |
| 2009/0291632 A1 * | 11/2009 | Braithwaite et al. | 455/7 |
| 2010/0075595 A1 * | 3/2010 | DeMarco et al. | 455/11.1 |
| 2010/0109771 A1 * | 5/2010 | Baik et al. | 330/149 |
| 2010/0118922 A1 * | 5/2010 | Ahn | 375/214 |
| 2010/0167639 A1 * | 7/2010 | Ranson et al. | 455/24 |

FOREIGN PATENT DOCUMENTS

WO 2008/109574 A1 9/2008

* cited by examiner

*Primary Examiner* — Tuan A Tran
(74) *Attorney, Agent, or Firm* — Coats & Bennett, P.L.L.C.

(57) ABSTRACT

The present application discloses systems and methods for reducing output-to-input feedback signal interference caused by a forwarding node that is configured to forward information received from a transmitter. In some embodiments, this output-to-input feedback signal interference is compensated for by the transmitter. For example, the transmitter is configured such that the signal that is transmitted by transmitter to the forwarding node includes both (1) a primary signal or 'desired' signal (e.g., the signal that is intended for a receiving device) and (2) a filtered version of the primary signal. The filter that produces the filtered version of the primary signal is configured (e.g., the filter's filter weights are adapted) such that the filtered version of the primary signal cancels or reduces the undesired output-to-input feedback signal.

19 Claims, 5 Drawing Sheets

SYSTEMS AND METHOD FOR CANCELING FEEDBACK INTERFERENCE

TECHNICAL FIELD

The present invention relates to communication systems. More specifically, the present invention relates to systems and method for canceling feedback interference.

BACKGROUND

Future communication systems (e.g., wireless wireless/cellular communication systems) are expected to require, among other things, increased coverage and/or support of higher data rates. A method to enhance coverage and data rate is to use some sort of forwarding node (FN) such as repeater or relay. The benefit from repeaters and relays stems primarily from their facilitating the splitting of a long distance link in to two links (or hops). This splitting allows increased data rate on each link as well as end-to-end total data rate.

The distinction between the repeaters and relays is not always entirely clear cut. Often, with a repeater, one means a simple low processing node that receives a signal, amplifies it and sends it out. Such nodes are referred to as Amplify and Forward (AF) nodes.

A relay, on the other hand, is normally considered a bit more advanced and complex than a repeater. A relay typically receives a signal, demodulates and forward error correction (FEC) decodes the signal, and then selects resource for retransmitting the signal. We will use the term Decode and Forward (DF) node for a node that demodulates and decodes a received signal prior to retransmitting the data included in the signal. Some relays may forward an estimate of its received signal to the destination. This type of relay is referred to as an Estimate and Forward (EF) node. To complicate things a bit, the term relay is often used broadly to encompass any node that forwards any piece of received information.

There are many different types of repeaters, such as frequency translating repeaters (FTR) and on-frequency repeaters (OFR). The so called on-frequency repeater is advantageous in that it avoids throughput loss that arises in many schemes where the forwarding node can not receive and transmit at the same time and on the same frequency. This loss is here denoted as duplex loss. Frequency-translating repeaters and relays generally suffer from duplex loss due to the normal operation of receiving and transmitting in different timeslots.

The on-frequency operation, which provides concurrent reception and transmission, is often achieved by high input-output antenna isolation and active self-interference cancellation. The later means that the repeater internally cancels the repeater output signal that is received by the repeater (i.e., the repeater feedback signal).

A shortcoming of using an on-frequency repeater is that the gain by which the repeater can amplify the incoming signal is limited. The maximum gain is mainly determined by the isolation between the repeater output and the repeater input and other means to cancel the feedback, such as any attenuation offered by internal interference cancellation. While several mechanisms have been suggested to further increase the output to input isolation (e.g., beamforming and MIMO techniques), it is likely that there will be situations when one would like to have larger on-frequency repeater output-to-input isolation than can be achieved using conventional means.

What is desired, therefore, are systems and methods for achieving larger output-to-input isolation than can be achieved using conventional means.

SUMMARY

In one aspect, the invention provides a method for performed by a transmitter for reducing repeater feedback interference. In some embodiments, this method includes the following steps: receiving filter adaptation information transmitted from a forwarding node; configuring an adaptive filter (e.g., a time domain filter or a frequency domain filter) using the filter adaptation information; using the configured adaptive filter to filter an input signal to produce a filtered version of the input signal; combining the input signal and the filtered version of the input signal to produce an output signal encompassing the input signal and the filtered version of the input signal; and transmitting the output signal to the forwarding node, the forwarding node having an input for receiving the output signal, wherein the step of configuring the adaptive filter using the filter adaptation information comprises configuring the adaptive filter so that the filtered version of the input signal is configured to reduce interference caused by a signal transmitted from an output of the forwarding node and received at the input of the forwarding node.

The step of transmitting the output signal may include using only a single transmit antenna to transmit the output signal or may include using two or more transmit antennas to transmit the output signal, where the output signal is a vector.

In some embodiments, the step of configuring the adaptive filter using the filter adaptation information comprises adjusting one or more filter weights based on the filter adaptation information. In some embodiments, the filter adaptation information includes information related to the forwarding node's output-to-input channel and/or information related to a transmit power of the forwarding node.

In some embodiments, the filtered version of the input signal is a function of the forwarding node's output-to-input channel, and the forwarding node is one of: (1) a decode and forward (DF) type forwarding node, (2) an amplify and forward (AF) type forwarding node, and (3) an estimate and forward (EF) type forwarding node. In some embodiments, the forwarding node does not perform equalization. In some embodiments, the step of combining includes a modulolattice operation.

In another aspect, the present invention provides a transmitter for reducing repeater feedback interference. In some embodiments, the transmitter includes: (1) a receiver for receiving filter adaptation information transmitted from a forwarding node; (2) an adaptive filter configured to: (i) receive an input signal, (ii) receive the filter adaptation information and (iii) use the filter adaptation information to produce a filtered version of the input signal; (3) a signal combiner for combining the input signal and the filtered version of the input signal to produce an output signal encompassing the input signal and the filtered version of the input signal; and (4) one or more transmit antennas for transmitting the output signal to the forwarding node, the forwarding node having an input for receiving the output signal. Advantageously, the adaptive filter is configured to use the filter adaptation information such that the filtered version of the input signal is configured to reduce interference caused by a signal transmitted from an output of the forwarding node and received at the input of the forwarding node.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
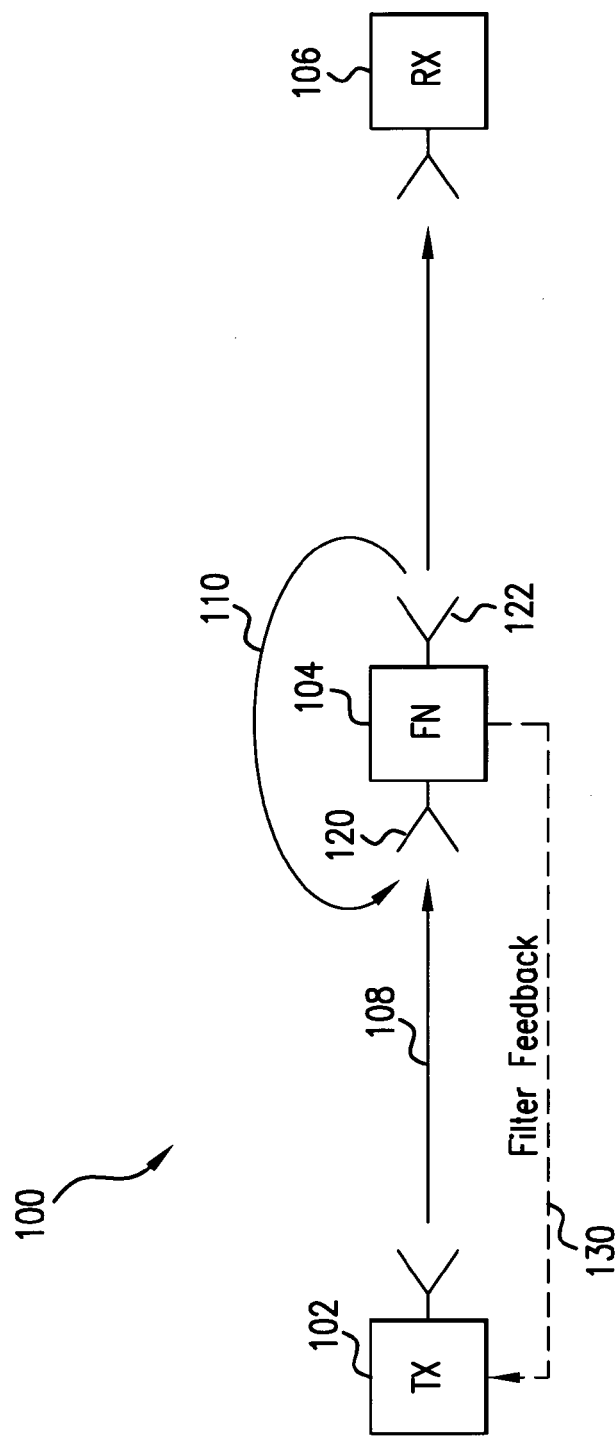
FIG. 1 illustrates a portion of a communication system according to some embodiments of the invention.

Referring now to FIG. 1, FIG. 1 illustrates a portion of a communication system 100 according to some embodiments of the invention. As illustrated, system 100 includes a transmitter node 102 (e.g., a base station) for transmitting a signal 108, a forwarding node 104 (e.g., an AF node, DF node, EF node or other forwarding node) configured to receive signal 108 and forward signal 110 to a set of receiving nodes 106 (e.g., 0 or more receiving nodes).

As illustrated in FIG. 1, signal 110 transmitted from the output 122 of forwarding node 104 may be received at the input 120 of forwarding node 104 together with signal 108. That is, signal 110 traverses the forwarding node's output-to-input channel. This forwarding node output-to-input feedback signal may interfere with signal 108.

In some embodiments, this output-to-input feedback signal interference is compensated for by transmitter 102. For example, transmitter 102 is configured such that the signal 108 that is transmitted by transmitter 102 includes both (1) the primary signal or "desired" signal (e.g., the signal that is intended for a receiving device 106) and (2) a filtered version of the same. The filter that produces the filtered version of the primary signal is configured (e.g., the filter's filter weights are adapted) such that the filtered signal cancels or reduces the undesired output-to-input feedback signal.

In this manner, the output-to-input isolation of forwarding node 104 is increased and its gain can be increased before self-oscillation and instability occur. The increased gain allows for extended communication range.

In some embodiments, the cancellation is achieved by linear methods (e.g., linear superposition coding (SPC)), while in other embodiments by non-linear methods (e.g., dirty paper coding (DPC)). In embodiments where the transmitter performs DPC, the repeater feedback interference is cancelled through a corresponding DPC decoding step performed at input 120 of forwarding node 104. Additionally, in some embodiments, forwarding node 104 is configured to transmit feedback information 130 to transmitter 102, which feedback information is used by transmitter to adapt the filtering of the primary signal.

While a DPC based solution may be more attractive in terms of power efficiency, for simplicity we exemplify an embodiment of the invention with the superposition coding first. We will also assume that the forwarding node 104 is of DF type. In principle it could also be of AF and EF type that perform equalization, but then in contrast to the DF variant considered first with a filtered noise term.

In the frequency domain, transmitter 102 transmits a signal $X(\omega)$, where $\omega$ is the angular frequency (for orthogonal frequency division multiplexing (OFDM) transmitters we can substitute k for $\omega$, where k is the subcarrier index for discrete tones). As discussed above, signal $X(\omega)$ encompasses (1) a primary signal $S(\omega)$ that shall be received and forwarded by forwarding node 104 and (2) a filtered (and generally slightly delayed) version of the signal $S(\omega)$ that cancels or reduces the interference caused by the output-to-input feedback signal.

If we let $R(\omega)$ represent the signal received at input 120, then: $R(\omega)=H_1(\omega)X(\omega)+H_0(\omega)Y(\omega)+W(\omega)$, where $H_1(\omega)$ represent the channel used by the transmitter to transmit $X(\omega)$ to forwarding node 104, $H_0(\omega)$ represent the forwarding node's output-to-input channel, $Y(\omega)$ is the signal transmitted by forwarding node 104, and $W(\omega)$ represents a noise signal. If $R(\omega)$ is desired to be $H_1(\omega)\sqrt{P_{TX}}S(\omega)$, where $\sqrt{P_{TX}}$ corresponds to the transmit power of transmitter 102, and $Y(\omega)$ is assumed to be $\sqrt{P_{RS}}S(\omega)e^{-j\omega\tau}$ (equation 1) (if forwarding node 104 is of AF or EF type, equation 1 should be complemented with a noise term), where $\sqrt{P_{RS}}$ represents the transmit power of forwarding node 104 and $\tau$ is the minimum processing delay of forwarding node 104, then solving for $X(\omega)$ (assuming no noise and that pre-equalization is used) yields:

$$X(\omega) = \sqrt{P_{TX}}\left(S(k) - \frac{\sqrt{P_{RS}}}{\sqrt{P_{TX}}}\frac{H_0(k)}{H_1(k)}S(k)e^{-j\omega\tau}\right). \quad \text{(equation 2)}$$

Thus, when transmitter transmits $X(\omega)$ as defined above, the forwarding node's output-to-input interference is cancelled and the primary signal $S(\omega)$ is received and forward by forwarding node 104 as desired. Equation 2 can be used when considering single stream transmission using transmit and/or receive beamforming.

Figure 2:
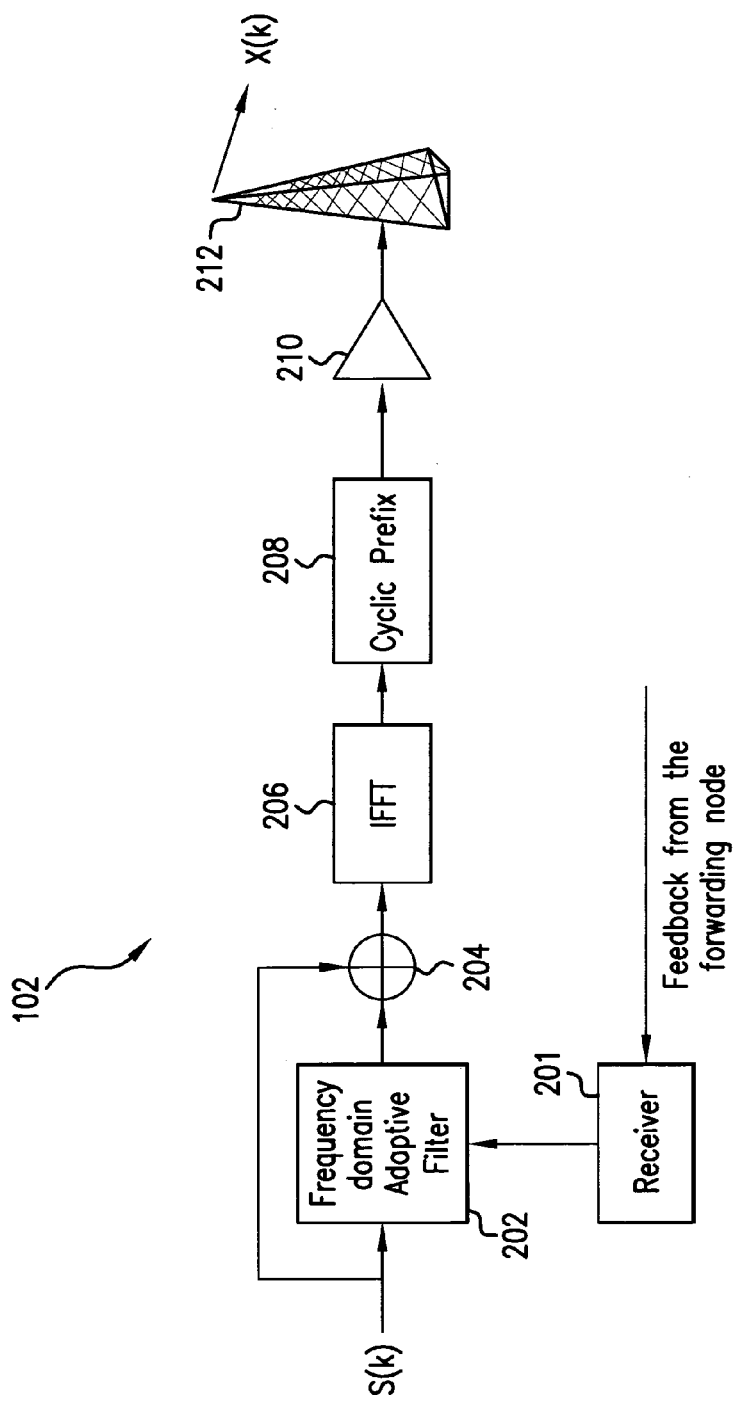
FIG. 2 is a functional bock diagram of a transmitting node according to some embodiments of the invention.

As discussed above, forwarding node 104 may send feedback information to transmitter 102, which uses the feedback information to adapt an adaptive filter 202 (see FIG. 2) in transmitter 104. Referring now to FIG. 2, FIG. 2 illustrates a functional block diagram of transmitter 102 according to some embodiments. In the embodiment shown in FIG. 2, transmitter 102 includes adaptive filter 202 that operates in the frequency domain. Filter 202 receives signal $S(\omega)$ and produces a filtered version of $S(\omega)$ that, as described above, is configured to cancel or reduce the interference caused by the output-to-input feedback signal. $S(\omega)$ and the filtered version of $S(\omega)$ are combined by a combiner 204, which in some embodiment includes an adder and also in other embodiments includes modulolattice module for performing a modulolattice operation. The result is provided to inverse Fast Fourier transform module 206 and then a cyclic prefix 208. An amplifier 208 may then amplify the signal, which is then transmitted using one or more antennas 212. In this manner, the present invention provides a transmitter based solution to interference cancellation.

Assuming forwarding node 104 is of the DF type (i.e., no noise at the node output) and dirty paper coding (DPC) is used, the corresponding frequency domain representation of the signal transmitted by the transmitter is:

$$X(\omega) = \sqrt{P_{TX}} \left( S(\omega) - \frac{\sqrt{P_{RS}}}{\sqrt{P_{TX}}} \frac{H_0(\omega)}{H_1(\omega)} S(\omega) e^{-j\omega\tau} \right)_\Lambda, \quad \text{(equation 3)}$$

where the operator $(\ )_\Lambda$ illustrates a modulo operation, typically written A=B mod Λ. This may for instance be accomplished with a scalar modulo operator for real and imaginary signal part that limits the magnitude by subtracting an integer of Λ for the real and imaginary part respectively until the result falls within the range [−Λ/2,+Λ/2]. Note that both the transmit and the receive side need to perform the modulo operation.

A benefit of the DPC operation is that it results in a more power efficient operation of the transmitter to repeater link (i.e., extra power is not invested for the interference cancellation signal). A possible disadvantage of the DPC solution is that, if it is performed in the time-domain, it can introduce fast transients that lead to spectrum widening. Another potential disadvantage is that the receiver will see a superposition of a DPC signal (from the transmitter) and non-DPC signal (from the repeater) which may require a more complex receiver. A possible disadvantage in the context of OFDM(A) is that a very high Λ may be required to account for the worst case signal peak. This may reduce the benefit of DPC in high PAPR type modulation schemes. However, if some distortion can be accepted (as is the case when clipping based OFDM is used for PAPR reduction by accepting an increased noise level), then the Λ can be reduced and the power efficiency for the DPC scheme can be improved.

The invention can also be applied in the time domain. In the time domain, the signal transmitted by the transmitter 102 may be expressed as follows:

$$x(n) = \sqrt{P_{TX}} \left( s(n) - \frac{f(n)}{\sqrt{P_{TX}}} * \sqrt{P_{RS}}\, s(n-\tau) \right), \quad \text{(equation 4)}$$

where $f(n)$ is selected such that $h_1(n) * f(n) = h_0(n)$, or equivalently, $$f(n) = F^{-1}\left( \frac{F(h_0(n))}{F(h_1(n))} \right),$$

where F is the Fourier transform and $F^{-1}$ is its inverse.

Figure 3:
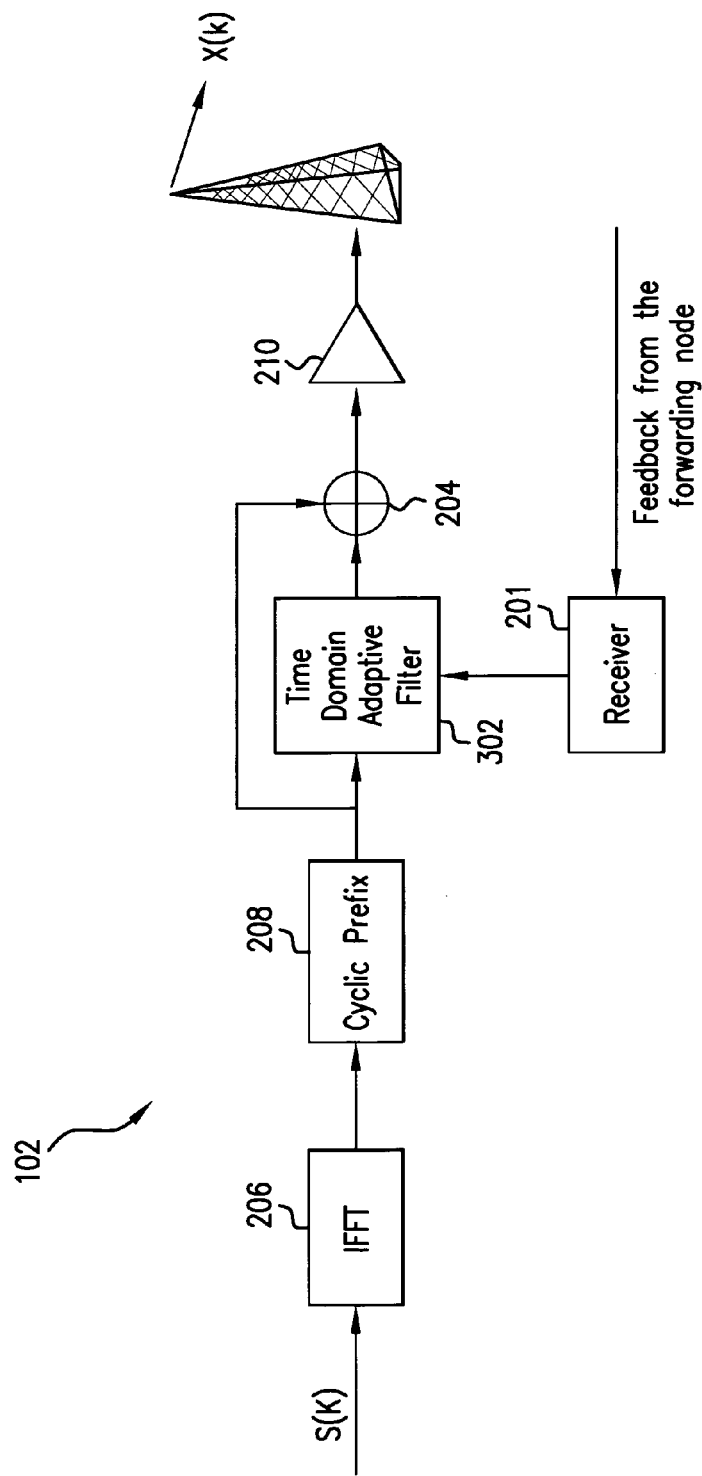
FIG. 3 is a functional bock diagram of a transmitting node according to some other embodiments of the invention.

Referring now to FIG. 3, FIG. 3 illustrates a functional block diagram of transmitter 102 according to embodiments where the filtering is performed in the time domain. As illustrated in FIG. 3, transmitter 102 includes an adaptive time domain filter 302.

In another embodiment, forwarding node 104 is of AF type, does not perform any equalization and also forwards noise, and transmitter 102 does not perform any pre-equalization. In this embodiment, the signal transmitted by transmitter 102 is expressed in the frequency domain as:

$$X(\omega) = \sqrt{P_{TX}} \left( S(\omega) - \frac{\sqrt{P_{RS}}}{\sqrt{P_{TX}}} H_0(\omega) S(\omega) e^{-j\omega\tau} \right). \quad \text{(equation 5)}$$

The approach without pre-equalization becomes particularly attractive in the time domain implementation as it can avoid finding the filter function $f(n)$ that depends on both reciprocal transfer function of $h_1(n)$. In this embodiment, the signal transmitted by transmitter 102 is expressed in the time domain as:

$$x(n) = \sqrt{P_{TX}} \left( s(n) - \frac{h_0(n)}{\sqrt{P_{TX}}} * \sqrt{P_{RS}}\, s(n-\tau) \right). \quad \text{(equation 6)}$$

The approach without pre-equalization has further large signal and rounding error benefits when dealing with DPC as there is no critical dependency on $H_1(k)$ and $h_1(n)$ of the transmit signal X(k) and x(n) respectively. In this approach, the signal transmitted by transmitter 102 is expressed in the time domain as:

$$x(n) = \sqrt{P_{TX}} \left( s(n) - \frac{h_0(n)}{\sqrt{P_{TX}}} * \sqrt{P_{RS}}\, s(n-\tau) \right)_\Lambda. \quad \text{(equation 7)}$$

Figure 4:
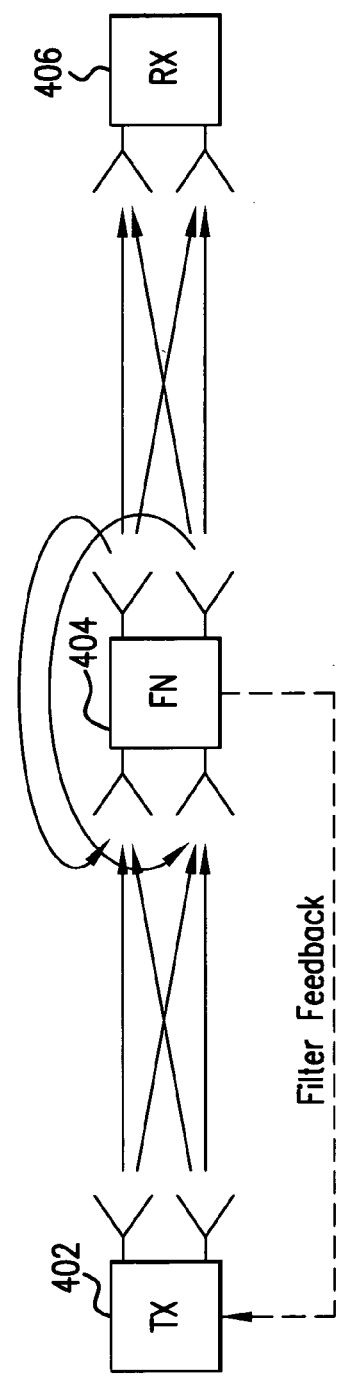
FIG. 4 illustrates a portion of a communication system according to some other embodiments of the invention.

In another embodiment, aspects of the invention are applied in the context of multiple antenna communication in general and spatial-multiplexed MIMO (i.e. multiple stream transmission) specifically. FIG. 4 illustrates this embodiment. As shown in FIG. 4, a transmitter 402 uses multiple antennas to transmit information to a forwarding node 404, which forwards the information to a set of receiving nodes 406. Assuming a matrix filter B(k) in forwarding node 404 and a matrix filter A(k) in transmitter 402, the condition for self-interference cancellation is $H_1(k)A(k)=H_0(k)B(k)H_1(k)$. B(k) may be selected in many ways, e.g. $B(k)=H_0^{-1}(k) \Rightarrow A(k)=I, B(k)=H_0^{-1}(k)H_1^{-1}(k) \Rightarrow A(k)=H_1^{-1}(k)$ or $B(k) = \text{MMSE}(\sqrt{P_{TX}}H_1(k)s(k)+w(k))$. In this embodiment (and assuming no pre-equalization), the signal transmitted by transmitter 402 is expressed in the frequency domain as:

$$x(\omega) = \sqrt{P_{TX}} \left( s(\omega) - \frac{\sqrt{P_{RS}} A(\omega) s(\omega)}{\sqrt{P_{TX}}} e^{-j\omega\tau} \right). \quad \text{(equation 8)}$$

Figure 5:
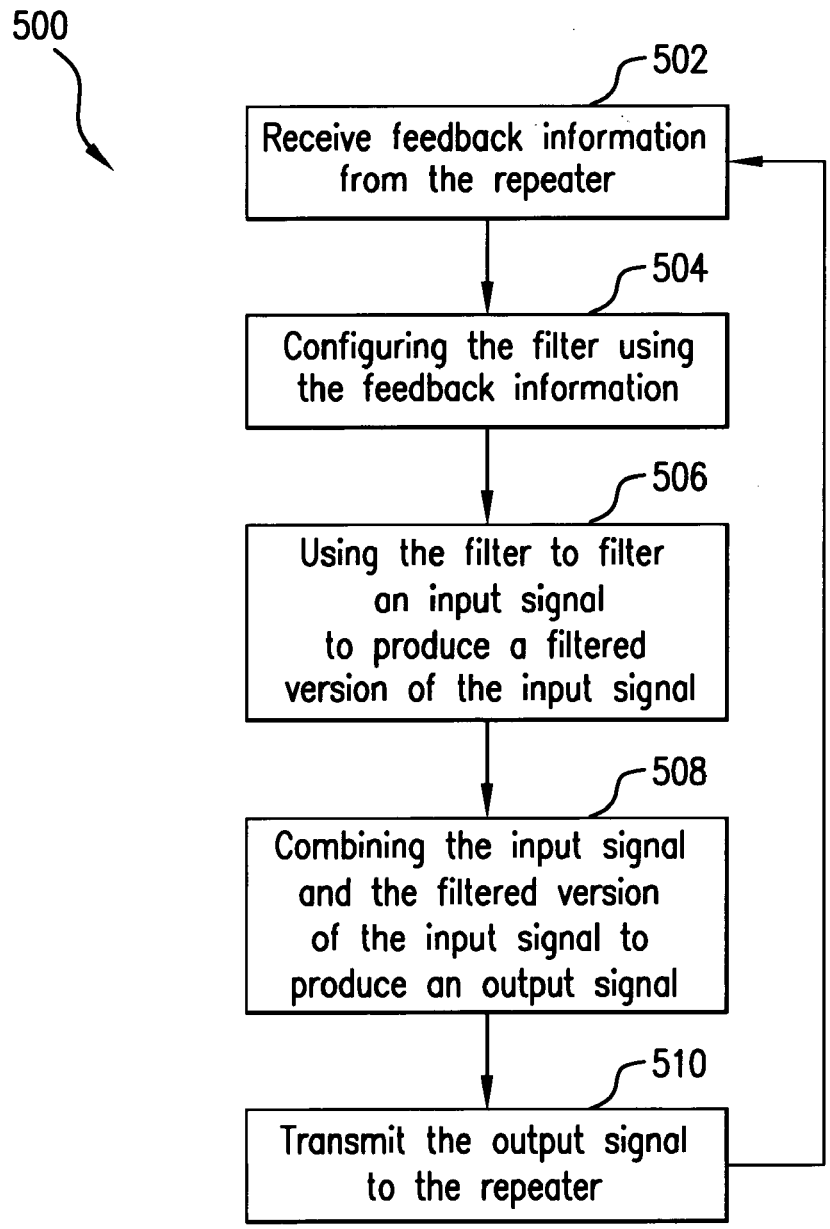
FIG. 5 is a flow chart illustrating a process according to some embodiments of the invention.

Referring now to FIG. 5, FIG. 5 is a flow chart illustrating a process 500, according to some embodiments, that is performed by transmitter 102 or 402 to cancel interference caused by forwarding node 104 or 404, respectively. Process 500 may begin in step 502, where the transmitter received feedback information from the forwarding node. The feedback information may include information related to the forwarding node output-to-input channel and/or information related to the forwarding node's amplification level. In step 504, the transmitter configures a filter (e.g., filter 202 or 302) using the received feedback information. In step 506, the transmitter uses the configured filter to filter an input signal (s) to produce a filtered version of the input signal (s'). In step 508, the transmitter combines s and s' to produce an output signal (x). In step 510, the transmitter transmits to a forwarding node (e.g., node 104 or 404) the output signal, which contains the input signal and the filtered version of the input signal. Advantageously, in step 504, the filter is configured such that the filtered version of the input signal will cancel or reduce an undesired output-to-input signal received at the input of the forwarding node. In this manner, interference cancellation is performed at the transmitter.

Using an above described interference cancellation system/method, it is possible to reduce the self-interference for an on-frequency repeater or relay. This will appear as an increase in the output-to-input isolation, which will allow an increase of the repeater amplification gain to overcome high path losses. This in turn translates into extended communication range. Moreover, DPC embodiments offer a power efficient way of transmitting an interference canceling signal over the transmitter to repeater path.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A transmitter configured to transmit an output signal to a forwarding node that has an input for receiving that output signal, wherein the transmitter comprises:
    a receiver for receiving from the forwarding node filter adaptation information that relates to output-to-input feedback signal interference at the forwarding node, said interference comprising interference at the input of the forwarding node caused by a signal transmitted from an output of the forwarding node;
    an adaptive filter configured to receive an input signal, to receive the filter adaptation information, and to reduce the output-to-input feedback signal interference at the forwarding node by using the filter adaptation information to produce a filtered version of the input signal;
    a signal combiner configured to combine the input signal and the filtered version of the input signal to produce the output signal, the output signal thereby encompassing the input signal and the filtered version of the input signal; and
    one or more transmit antennas for transmitting the output signal to the forwarding node.

2. The transmitter of claim 1, wherein the transmitter is configured to use only a single transmit antenna for transmitting the output signal.

3. The transmitter of claim 1, wherein the transmitter is configured to use two or more transmit antennas to transmit the output signal, and wherein the output signal is a vector.

4. The transmitter of claim 1, wherein the adaptive filter is configured to adjust one or more filter weights based on the filter adaptation information to produce the filtered version of the input signal.

5. The transmitter of claim 1, wherein the filter adaptation information comprises at least one of information related to the forwarding node's output-to-input channel and information related to a transmit power of the forwarding node.

6. The transmitter of claim 5, wherein the filtered version of the input signal is a function of the forwarding node's output-to-input channel.

7. The transmitter of claim 1, wherein the adaptive filter is a frequency domain filter.

8. The transmitter of claim 1, wherein the adaptive filter is a time domain filter.

9. A method performed by a transmitter for reducing feedback interference at an input of a forwarding node, the method comprising:
    receiving filter adaptation information transmitted from the forwarding node, wherein the filter adaptation information relates to output-to-input feedback signal interference at the forwarding node, said interference comprising interference at the input of the forwarding node caused by a signal transmitted from an output of the forwarding node;
    reducing the output-to-input feedback signal interference at the forwarding node by configuring an adaptive filter using the filter adaptation information and using the configured adaptive filter to filter an input signal to produce a filtered version of the input signal;
    combining the input signal and the filtered version of the input signal to produce an output signal encompassing the input signal and the filtered version of the input signal; and
    transmitting the output signal to the forwarding node.

10. The method of claim 9, wherein transmitting the output signal comprises using only a single transmit antenna to transmit the output signal.

11. The method of claim 9, wherein transmitting the output signal comprises using two or more transmit antennas to transmit the output signal, and wherein the output signal is a vector.

12. The method of claim 9, wherein configuring the adaptive filter using the filter adaptation information comprises adjusting one or more filter weights based on the filter adaptation information.

13. The method of claim 9, wherein the adaptive filter is a frequency domain filter.

14. The method of claim 9, wherein the adaptive filter is a time domain filter.

15. The method of claim 9, wherein the filter adaptation information comprises at least one of information related to the forwarding node's output-to-input channel and information related to a transmit power of the forwarding node.

16. The method of claim 15, wherein the filtered version of the input signal is a function of the forwarding node's output-to-input channel.

17. The method of claim 9, wherein the forwarding node is one of a decode and forward (DF) type forwarding node, an amplify and forward (AF) type forwarding node, and an estimate and forward (EF) type forwarding node.

18. The method of claim 9, wherein the forwarding node does not perform equalization.

19. The method of claim 9, wherein said combining includes a modulolattice operation.

* * * * *